United States Patent
Furuhashi et al.

(10) Patent No.: US 6,838,102 B1
(45) Date of Patent: Jan. 4, 2005

(54) FROZEN PIE DOUGH SHOWING GOOD RISING

(75) Inventors: Toshiaki Furuhashi, Ibaraki (JP); Masashi Nakahara, Ibaraki (JP)

(73) Assignee: Japan Tobacco Inc., Tokyo (JP)

( * ) Notice: Subject to any disclaimer, the term of this patent is extended or adjusted under 35 U.S.C. 154(b) by 0 days.

(21) Appl. No.: 09/762,586

(22) PCT Filed: Jun. 29, 1999

(86) PCT No.: PCT/JP99/03495

§ 371 (c)(1),
(2), (4) Date: Feb. 4, 2001

(87) PCT Pub. No.: WO00/08941

PCT Pub. Date: Feb. 24, 2000

(30) Foreign Application Priority Data

Aug. 11, 1998 (JP) .......................................... 10-227334

(51) Int. Cl.⁷ ............................................... A21D 10/00
(52) U.S. Cl. ..................... 426/94; 426/128; 426/275; 426/496; 426/549; 426/551; 426/556
(58) Field of Search .......................... 426/496, 94, 549, 426/551, 556, 128, 275

(56) References Cited

U.S. PATENT DOCUMENTS 4,020,188 A * 4/1977 Forkner ....................... 426/95
4,170,659 A * 10/1979 Totino et al. ................. 426/95
4,275,082 A * 6/1981 Dougan ........................ 426/92
4,381,315 A * 4/1983 Yong et al. .................. 426/128
4,917,907 A * 4/1990 Kwis et al. .................... 426/90
5,576,036 A * 11/1996 Pesheck et al. ............... 426/94

FOREIGN PATENT DOCUMENTS

| EP | 0 350 983 A1 | 1/1990 |
| JP | B2370455 | 11/1991 |
| JP | A4200338 | 7/1992 |
| JP | A104863 | 2/1998 |

* cited by examiner

*Primary Examiner*—Lien Tran
(74) *Attorney, Agent, or Firm*—Birch, Stewart, Kolasch & Birch, LLP

(57) ABSTRACT

The frozen pie dough product according to the invention contains a cereal flour, water and a fat as the main components, has a multi-layer structure having voids, has a pie dough density of 1.01 g/cm³ or more and less than 1.085 g/cm³, and contains unreacted chemical leavening agents remaining therein. By baking the frozen pie dough product even in a short time in a high-power oven after freezing, it is possible to give a product which is in a stable and well-risen state with a layered texture, can be easily baked and has a crispy texture.

20 Claims, No Drawings

FROZEN PIE DOUGH SHOWING GOOD RISING

This application is the national phase under 35 U.S.C. §371 of PCT International Application No. PCT/JP99/03495 which has an International filing date of Jun. 29, 1999, which designated the United States of America.

TECHNICAL FIELD

This invention relates to a frozen pie dough product which comprises a cereal flour, water and a fat as main starting materials and can provide a pie in a stable and well-risen state, showing a favorable layered structure, being easily baked and presenting a highly crispy texture, when baked even in a short time in a high-power oven after freezing.

BACKGROUND ART

Frozen pie products prepared by the conventional methods are obtained by wrapping a roll-in fat in a dough, repeatedly folding the dough to give a pie dough wherein dough layers and fat layers are laminated alternately, and wrapping a filling, etc. in this pie dough. When such a frozen pie dough product is baked in an oven (in particular, a high-power oven at a high temperature in a short time) directly from the frozen state, heat transfers quickly in the periphery of the dough but slowly in the inside. Thus, the inside starts to puff after the baking and hardening of the periphery has considerably proceeded. As a result, the baked pie has a non-uniform shape. Since heat can only insufficiently transfer toward the inside, moreover, there arise some problems such that the pie is half-baked in some parts and has a less crispy and poor texture.

To overcome these problems, it has been a practice to thaw a frozen dough before cooking or to bake at a low temperature over a long period of time when a frozen dough is baked as such.

To obtain a pie product of certain qualities by thawing a frozen dough product, the thawing temperature and time should be sufficiently controlled. In addition, it takes a long time for thawing. That is to say, a lot of labor and skill are needed therefor. On the other hand, it takes a considerably long time to bake a frozen pie dough product at a low temperature. Accordingly, there arises a problem in this case that baking cannot be conveniently performed anytime needed. It is impossible to obtain a final product having a favorable and well risen layered structure and a crispy texture inherent to pie by baking the conventional frozen pie dough products directly in a frozen state by using a high-power oven. It is an object of the invention to solve these problems.

DISCLOSURE OF THE INVENTION

The inventors have conducted intensive studies to solve the above-described problems. As a result, they have successfully found out that the above problems can be solved by using chemical leavening agents, which is not conventionally employed in pie dough, and providing voids and the chemical leavening agents between dough layers and fat layers in a pie dough containing a cereal flour, water and a fat as the main components, thereby completing the invention.

Accordingly, the invention relates to a frozen pie dough to be stored in a frozen state which comprises a pie dough wherein dough layers containing a cereal flour, water and a fat as the main components and fat layers are laminated alternately, characterized in that voids and chemical leavening agents are present between the dough layers and the fat layers of the above-described pie dough, and a frozen pie dough product with the use of the same.

BEST MODE FOR CARRYING OUT THE INVENTION

In the invention, a substance prepared by mixing and kneading together a cereal flour, water, a fat and other materials is defined as a "dough". A fat which is to be wrapped in this dough is defined as a "roll-in fat", while a fat which is to be kneaded into the dough in the step of mixing the dough is defined as a "knead-in fat". A substance prepared by folding the dough in which the roll-in fat is wrapped to give a multi-layer structure is defined as a "pie dough". The continuous layers constituting the pie dough are respectively called "dough layers" and "fat layers". Products obtained by using the pie dough, for example, shaped pies having fillings (apple filling, meat filling, etc.) wrapped in the dough and pie sheets obtained by merely cutting the dough are called "pie dough products" and products obtained by baking these pie dough products are defined as "pies".

The chemical leavening agents as used in the invention mean agents which comprise alkaline leavening agents, leavening acid reacting with the gas-generating agent to thereby control the gas-generating speed, and wheat flour, corn starch, etc. employed for ensuring the uniform dispersion of the gas-generating agent and the leavening acid and preventing moisture absorption. Spaces formed in the pie dough due to the gas generated from the chemical leavening agents are defined as "voids".

The cereal flour, which is the main component of the pie dough, contains wheat flour as the base. In addition, it may contain other flours (rice flour, buckwheat flour, barley flour or the like) depending on the purpose, if needed. In preparing the dough, water may be added in such an amount as generally employed in preparing pie dough. In usual, water is added in an amount of from 45 to 65% by weight, preferably from 50 to 60% by weight, based on the cereal flour. The content of water may be controlled so that the dough layer has a hardness almost comparable to the hardness of the fat layer (so-called roll-in fat) to be laminated on the dough layer in the subsequent step. In case of adding milk or egg to the dough, the moisture contained therein is also included in the water content.

As the roll-in fat serving as the fat layer or the knead-in fat to be kneaded into the dough, use may be made of butter, margarine or shortening commonly employed in pie products. In case where the pie dough has a thickness of 2.5 to 4.0 mm, the roll-in fat may be added in an amount of from 45 to 85% by weight, preferably from 50 to 75% by weight, based on the weight of the cereal flour.

It is preferable that the number of the fat layers made of the roll-in fat is smaller than in the conventional folded pie doughs. Namely, it is preferable to form 32 to 64 fat layers, still preferably 32 to 48 fat layers. When the number of the fat layers is less than 32, the dough layers and the fat layers become too thick. In this case, the inner layers cannot uniformly puff and thus are half-baked. In addition, because the dough layers are thick, the taste becomes hard and shows no crispiness. When 64 or more fat layers are formed, the dough layers become too thin. In this case, the dough layers cannot hold the gas generated from the chemical leavening agents in the baking step and thus the whole pie dough fails to puff.

On the other hand, the content of the knead-in fat, which is added to the dough for improving the extensibility and plasticity thereof, ranges from 3 to 12% by weight, preferably form 5 to 10% by weight, based on the weight of the cereal flour.

The chemical leavening agents, which are a mixture obtained by mixing alkaline leavening agents and leavening acid undergoing a neutralization reaction with the gas-generating agent optionally together with a dispersant, can be made a quick action type, a delayed action type, a long-lasting action type, etc. by appropriately controlling the combination of the leavening acid depending on the purpose, and texture of the product, the method of preparing the dough and the like. As the gas-generating agent to be used in the invention, it is desirable to select sodium hydrogencarbonate which generates carbon dioxide gas. The gas generating speed can be controlled by appropriately combining the gas-generating agent with the leavening acid. In the present invention, the chemical leavening agents are spread onto the dough or the roll-in fat and then the roll-in fat is wrapped in the dough followed by folding. Thus, the chemical leavening agents are uniformly dispersed between respective dough layers and fat layers. In the chemical leavening agents, the gas-generating agent and the leavening acid are dissolved in the moisture contained in the pie dough and react with each other to thereby generate a gas in the step of preparing the pie dough. As a result, voids are formed between the dough layers and the fat layers. In the step of freezing the pie dough thus prepared, a part of the chemical leavening agents should remain in the unreacted state in the dough. Therefore, it is necessary to combine a quick action type acidic agent with a delayed action type acidic agent. As the delayed action type acidic agent which should generate a gas before the solidification of the dough in the step of baking in an oven following the freezing, it is preferable to use an acidic agent capable of reacting with the gas-generating agent at as low temperature as possible (60° C. or lower), for example, burnt alum, sodium pyrophosphate, etc. Examples of the quick action type acidic agent include sodium primary phosphate, fumaric acid, and gluconic 5-lactone. As the dispersing agent, it is preferable to use wheat flour which is employed in the pie dough. To achieve the desired dispersion, it is used in an amount of from 20 to 30% by weight in the chemical leavening agents. The content of the chemical leavening agents ranges from about 0.5 to 5% by weight, preferably from 2.0 to 4.0% by weight, based on the weight of the cereal flour in the dough. In case of using sodium hydrogencarbonate, the content of the gas-generating agent ranges from about 0.3 to 2% by weight, preferably from 0.5 to 1.5% by weight based on the weight of the cereal flour.

The chemical leavening agents, which are a mixture obtained by mixing alkaline leavening agents and leavening acid undergoing a neutralization reaction with the gas-generating agent optionally together with a dispersant, can be made a quick action type, a delayed action type, a long-lasting action type, etc. by appropriately controlling the combination of the leavening acid depending on the purpose, and texture of the product, the method of preparing the dough and the like. As the gas-generating agent to be used in the invention, it is desirable to select sodium hydrogencarbonate which generates carbon dioxide gas. The gas generating speed can be controlled by appropriately combining the gas-generating agent with the leavening acid. In the present invention, the chemical leavening agents are spread onto the dough or the roll-in fat and then the roll-in fat is wrapped in the dough followed by folding. Thus, the chemical leavening agents are uniformly dispersed between respective dough layers and fat layers. In the chemical leavening agents, the gas-generating agent and the leavening acid are dissolved in the moisture contained in the pie dough and react with each other to thereby generate a gas in the step of preparing the pie dough. As a result, voids are formed between the dough layers and the fat layers. In the step of freezing the pie dough thus prepared, a part of the chemical leavening agents should remain in the unreacted state in the dough. Therefore, it is necessary to combine a quick action type acidic agent with a delayed action type acidic agent. As the delayed action type acidic agent which should generate a gas before the solidification of the dough in the step of baking in an oven following the freezing, it is preferable to use an acidic agent capable of reacting with the gas-generating agent at as low temperature as possible (60° C. or lower), for example, burnt alum, sodium pyrophosphate, etc. Examples of the quick action type acidic agent include sodium primary phosphate, fumaric acid, and gluconic 5-lactone. As the dispersing agent, it is preferable to use wheat flour which is employed in the pie dough. To achieve the desired dispersion, it is used in an amount of from 20 to 30% by weight in the chemical leavening agents. The content of the chemical leavening agents ranges from about 0.5 to 5% by weight, preferably from 2.0 to 4.0% by weight, based on the weight of the cereal flour in the dough. In case of using sodium hydrogencarbonate, the content of the gas-generating agent ranges from about 0.3 to 2% by weight, preferably from 0.5 to 1.5% by weight based on the weight of the cereal flour.

The leavening acid is used in order to control the reaction speed of the gas-generating agent. It is necessary in the present invention to determine the composition rate depending on the temperature and time for the preparation of the pie dough, the amount of the voids (thickness) formed in the pie dough and the amount of the chemical leavening agents remaining in the pie dough. The content of the leavening acid to the gas-generating agent is controlled so as to adjust the pH value of the final dough to from about 5.0 to 6.8 after the neutralization reaction with the gas-generating agent. The ratio of the quick action type acidic agent to the delayed action type acidic agent (quick action type acidic agent: delayed action type acidic agent) ranges from 10:90 to 50:50. When the content of the chemical leavening agents is too small, it fails to exert the effect as chemical leavening agents. On the other hand, it is undesirable from the viewpoint of taste to use the chemical leavening agents in an excessively large amount, since the bitterness due to the chemical leavening agents is enhanced in this case.

As other materials, salt, skim milk powder, sugars, emulsifiers, egg, milk, etc. commonly employed in pie dough products may be added. These materials are kneaded into the dough. The content of salt ranges from 0.6 to 1.5% by weight, the content of skim milk powder ranges from 0 to 8% by weight, the content of sugars ranges from 0 to 5% by weight, the content of egg ranges from 0 to 20% by weight and the content of milk ranges from 0 to 30% by weight, each based on the weight of the cereal flour in the dough. These materials are selected by taking the desired coloration, flavor and texture of the pie and the flavor into consideration. The moisture contained in egg and milk is also included in the water content. In case of using egg and milk, it is therefore necessary to regulate the amount of water to be added.

The voids in the pie dough of the invention mean spaces which are present between the dough layers and the fat layers of the pie dough. These voids can be observed by cutting the pie dough product in a frozen state. Because of having been formed by the gas-generating reaction of the chemical leavening agents spread along the fat layer, these voids are seemingly present somewhat continuously to thereby form layers. The thickness of such a layer cannot be measured by the naked eye but can be roughly calculated based on the thickness of the pie dough, the folding number of the layers on which the chemical leavening agents have been spread, and the dough -density ratio of the pie dough having the voids to a void-free pie dough of the same composition (i.e., dough density of pie dough containing chemical leavening agent layer/dough density of untreated pie dough). Provided that the chemical leavening agents are uniformly dispersed to form layers, the thickness of the void layer is represented by the following formula:

(pie dough thickness)×(1—dough density of pie dough containing chemical leavening agent layer/dough density of untreated pie dough) ÷(number of chemical leavening agent layers).

In case where the void thickness is too small, no effect can be achieved. In case where the void thickness is too large, the final product is provided with large voids and thus fails to achieve any crispy texture inherent to pie.

The number of the void layers, which depends on the manner of spreading the chemical leavening agents on the dough surface and the folding number of the fat layer, ranges from 16 to 128, preferably from 24 to 72. In case where the chemical leavening agents are spread on both faces of 32 fat layers, for example, 64 void layers are formed. When an excessively large number of void layers are formed, each void becomes too thin. On the other hand, well-balanced puffing of the final product cannot be established when the number of the void layers is too small.

Compared with the conventional pie doughs, the pie dough according to the invention has a low density due to the voids present between the dough layers and the fat layers. The conventional pie doughs have a density of about 1.08 g/cm$^3$ to 1.11 g/cm$^3$ at a fat content of from 45 to 90% based on the weight of the cereal flour, though the density varies depending on the fat content (the contents of the roll-in fat and the knead-in fat) of the dough. In contrast, the pie dough of the invention has a density of 1.01 g/cm$^3$ or more and less than 1.085 g/cm$^3$, preferably from 1.02 g/cm$^3$ to 1.075 g/cms. When the pie dough density is 1.085 g/cm$^3$ or more, sufficient rise cannot be achieved after baking and thus the texture becomes heavy. When the pie dough density is 1.01 g/cm$^3$ or less, the void thickness of the pie dough is enlarged and a crispy texture inherent to pie cannot be sustained any longer. In the invention, the pie dough density is measured in the following manner. A frozen pie dough is thawed to a temperature (about –5° C.) at which the pie dough can be cut and then cut into pieces (10 cm×10 cm). Each pie dough piece is weighed to determine weight. To determine volume, the thickness of each pie dough piece is measured at three points of each side (both ends and at around the center) and the average of the 12 thicknesses thus measured is referred to as the representative thickness. Thus the density is calculated. Five samples are employed (n=5) and the average is referred to as the pie dough density.

In the pie dough according to the invention, it is preferable that the gas yield generateed from the chemical leavening agents remaining unreacted in the step of baking (hereinafter referred to as the remaining gas yield) per gram of the pie dough ranges from 0.1 ml/g to 1.2 ml/g (measured at 40° C.), still preferably form 0.2 ml/g to 1.0 ml/g. This ratio can be regulated by selecting appropriate chemical leavening agents and controlling the conditions (temperature, time, etc.) in the preparation of the pie dough depending on the aimed product. When the remaining gas yield is too small, the puffing of the pie dough cannot be promoted in the step of heating. When the remaining gas yield is too large, there arises a problem that the dough layers peel off from the fat layers, thereby making the pie dough shape unstable. The remaining gas yield in the pie dough is measured by introducing a 50 g portion of the pie dough into a 360 ml Erlenmeyer flask, putting the flask into a thermostat at 40° C., elevating the dough temperature, thus reacting the chemical leavening agents in the pie dough to generate a gas, collecting the thus generateed gas into a cylinder by the replacement on water, and then measuring the volume. The measurement is carried out for about 3 hours. The chemical leavening agents remaining in the pie dough can be almost completely reacted at 40° C. within 3 hours. Then the volume gain caused by the heat puff of air originally contained in the flask is subtracted from the gas volume-thus measured and the difference is referred to as the remaining gas yield. The heat puff volume of the air is considered as the volume change (calculated as the puff of an ideal gas under the atmospheric pressure) caused by the difference in temperature in the flask at the initiation of the measurement and at the termination of the measurement.

Next, a process for producing the pie dough product in according to the present invention will be described.

First, a dough is prepared. A cereal flour, water and a fat are mixed and kneaded in a mixer to give a dough having a hardness appropriate for the purpose. As a machine for preparing the dough, use can be made of a mixer (a horizontal mixer, a vertical mixer, etc.) commonly employed in the art.

Then the dough thus kneaded is rolled into a sheet of about 5 to 25 mm in thickness. Examples of a machine to be used for rolling the dough into a sheet and folding a roll-in fat and chemical leavening agents to give a layered structure include a reverse sheeter commonly employed in the art and a Stretcher Line manufactured by Rheon.

After uniformly spreading chemical leavening agents all over the surface of the dough rolled into a sheet, a roll-in fat (thickness: about 5 to 15 mm) is wrapped in the dough. Alternatively, a fold-in fat is put on the dough, then the chemical leavening agents are spread all over the fat surface and then the roll-in fat is wrapped in the dough. Next, the dough having the chemical leavening agents and the roll-in fat wrapped therein is rolled into a thin sheet and folded. Then the sheet is further rolled into a sheet and folded. By repeating this procedure several times, fat layers and chemical leavening agent layers are formed in the dough. In the course of the preparation of this pie dough, a part of the spread chemical leavening agents reacts so that almost uniform and continuous voids are formed between the fat layers and the dough layers. The conditions (mixing speed, time, etc.) for the preparation of the dough may be appropriately selected depending on the desired dough hardness. The temperature of the kneaded dough and the time till the shaping and the initiation of freezing may be appropriately selected depending on the desired gas-generating reaction of the chemical leavening agents. In usual, the dough temperature ranges from 15 to 25° C. and the shaping time ranges from about 5 to 60 minutes. The amount of the chemical leavening agents remaining in the dough is decreased as the temperature is elevated and the shaping time is prolonged.

Finally, the pie dough product is shaped into a final shape and frozen in a freezer. After ceasing the gas-generating reaction of the chemical leavening agents, the product is stored in a frozen state. By storing in the frozen state, the chemical leavening agents can remain in the dough. The pie in the frozen state can be directly baked as such to give a pie product.

The voids in the invention can be formed by providing the chemical leavening agents and the roll-in fat on the dough, then wrapping the roll-in fat in the dough, and folding the dough in such a manner as to maintain the layered structure of the dough. In the pie dough according to the invention, voids can be formed by the chemical leavening agents which are present between the dough and the roll-in fat and, moreover, uniform void layers can be formed among the dough layers after baking owing to the unreacted chemical leavening agents which are present between the dough layers and the fat layers. By folding the dough, the chemical leavening agents spread on the dough surface are dispersed in each layer in the multi-layer structure. Then the gas-generating agent and the leavening acid are dissolved in the moisture contained in the dough and undergo the gas-generating reaction, thereby forming voids. The thickness of the voids can be regulated by controlling the type and amount of the chemical leavening agents, the dough temperature in the step of preparing the pie dough and the pie dough preparation time after spreading the chemical leavening agents on the dough surface. By controlling these factors, it is possible that the chemical leavening agents are reacted in the step of shaping the pie dough to thereby generate a gas in an amount required for the formation of the desired voids and then the gas-generating reaction is ceased by freezing the pie dough, thereby allowing the unreacted chemical leavening agents to remain in the pie dough. In the baking step, the unreacted chemical leavening agents, which remains in the pie dough until baking, reacts to promote the puffing of the dough layers and thus a well risen pie product can be obtained. The dough temperature in the pie dough shaping step may be at a level commonly employed in preparing pie dough, namely, from about 15 to 25° C. It takes about 5 to 60 minutes to prepare the pie dough, namely, from spreading the chemical leavening agents on the dough surface to the initiation of freezing the pie dough or the pie dough product.

In baking the frozen pie dough or the frozen pie dough product according to the invention, a well risen pie product having a layered texture can be obtained by baking it in a commonly employed oven (a fixed pot, a reel oven, a rack oven, etc.) at a usual temperature for a usual time. However, a particularly high-quality pie product, which is well risen, has a layered texture and can be easily baked, can be obtained by using a jet oven or a convection oven ensuring high-temperature and short-time baking.

In case where the frozen pie dough according to the invention is baked directly from the frozen state in a high-power oven, the gas generated from the chemical leavening agents remaining in the unreacted state in the pie dough is concentrated in the void layers at the early stage of heating (at low pie dough temperature of 40° C. or less) and triggers the puffing, thereby promoting the smooth puffing of the whole pie dough. Water vapor generated from the fat and the dough by heating migrates into the void layers and thus the whole dough layers are uniformly risen. At the same time, the vapor contributes to the uniform heat transfer toward the center of the pie dough. As a result, it becomes possible to obtain a pie which has a stable shape, can be easily baked, is well risen to give a layered texture and has a crispy and favorable texture.

The invention will be described in greater detail by reference to the following Examples.

EXAMPLE 1

Frozen Apple Pie Dough (1)

A frozen pie dough of the composition as listed in Table 1 was prepared. Table 2 shows the composition of the chemical leavening agents given in Table 1. 750 g of hard wheat flour, 250 g of soft wheat flour, 12 g of salt, 8 g of a knead-in fat and 55 g of water were mixed and kneaded in a vertical 10 L mixer (Kanto Kongoki). The kneading was performed at a low speed for 3 minutes and then at a medium speed for 5 minutes. After kneading, the dough temperature was 20° C. The dough was rolled and the chemical leavening agents and the roll-in fat were wrapped therein in the following manner. The dough was rolled to give a sheet of about 210 mm in width, about 100 mm in length and about 7 mm in thickness. 30 g of the chemical leavening agents for spreading was uniformly spread all over the dough surface. Then 650 g of the roll-in fat (margarine) of about 100 mm in length, about 100 mm in width and about 7 mm in thickness was placed thereon. The dough was folded in two thereby wrapping the chemical leavening agents and the margarine. The dough having the chemical leavening agents and the margarine wrapped therein was rolled with a reverse sheeter (Kamata Kikai) to give a thin sheet of about 5 mm in thickness. After folding in two, the sheet was further rolled into a sheet of about 5 mm in thickness. After folding in four, the sheet was further rolled into a sheet of about 5 mm in thickness and then folded in four. Finally, it was rolled into a sheet of 3.0 mm in thickness to thereby give a pie dough consisting of 32 fold-in fat layers and 64 chemical leavening agent layers. This pie dough was cut into rectangular pieces (150 mm in length×60 mm in width, 150 mm in length×65 mm in width) and 35 g of an apple filling (moisture content: 63%) was wrapped in these two pie dough pieces (total weight: 60 g) to give an apple pie of 60 mm in width and 150 mm in length. The dough temperature at the shaping step was 22° C. The time required for shaping the dough (i.e., from the spreading of the chemical leavening agents to the introduction into a freezer) was 30 minutes. After freezing in the freezer at −30° C. for 40 minutes, a frozen apple pie dough of a center temperature of −18° C. was obtained.

TABLE 1

Frozen pie dough composition

| Material | Content (g) |
| --- | --- |
| Hard wheat flour | 750 |
| Soft wheat flour | 250 |
| Knead-in fat | 8 |
| Salt | 12 |
| Water | 55 |
| Roll-in fat (margarine) | 650 |
| Chemical leavening agents | 30 |

TABLE 2

Chemical leavening agent composition

| Material | Content (wt. %) |
| --- | --- |
| Sodium hydrogencarbonate | 32 |
| Acidic sodium pyrophosphate | 19 |
| Burnt alum | 9 |
| Fumaric acid | 7 |
| Gluconic δ-lactone | 6 |
| Wheat flour | 27 |

As the result of measurement, this frozen pie dough had a density of 1.052 g/cm$^3$. The pie dough density was measured by cutting the pie dough into square pieces (10 cm×10 cm) and measuring the thickness and weight. When the vertical and horizontal sections to the void layers were observed, several void layers were definitely observed along the fat layers.

50 g of the pie dough at -5° C. was put into a 360 ml Erlenmeyer flask and reacted in a thermostat at 40° C. for 3 hours. The gas genterateed from the chemical leavening agents remaining in the pie dough was collected in a cylinder by the replacement on water. As a result, 45 ml of gas was finally collected. By subtracting the volume gain (21 ml) caused by the heat puff of air in the cylinder (increase in temperature: from 20° C. at the initiation of the measurement to 40° C. at the termination of the measurement) from the above value, the remaining gas yield in the pie dough was calculated as 0.48 ml/g. The air puff in the cylinder was calculated by regarding the air as an ideal gas. When the volume of the air in the flask at the initiation of the measurement (absolute temperature Ti) is referred to as V1 and the volume of the air in the flask at the termination of the measurement (absolute temperature T2) is referred to as V2, the relation $V1/V2 = T1/T2$ is established. In this case,. V1=flask capacity (360 ml)—volume of pie dough to be measured (50 g ÷1.052 g/cm$^3$)=312.5 ml, T1=293K, and T2=313K. Thus, $V2=V1 \times T2/T1=312.5 \times 313/293=333.8$ ml. Accordingly, the volume gain is calculated as 333.8–312.5= ca. 21 ml.

The frozen apple pie dough thus obtained was stored in a frozen state in a freezer at −18° C. for 10 days. Then it was taken out from the freezer and baked without thawing in a jet oven at 270° C. for 6 minutes and 30 seconds to give an apple pie. As Table 3 shows, the apple pie thus obtained showed uniform rising as a whole with a layered texture, a favorable color and a crispy texture and could be easily baked. Also, the pie dough in the part of the apple filling could be easily baked and showed a favorable crispy texture.

EXAMPLE 2

Frozen Apple Pie Dough (2)

A frozen apple pie dough was obtained by using the composition of Example 1 and controlling the dough preparation time after spreading the chemical leavening agents to 10 minutes. The mixing, folding, shaping and freezing were carried out under the same conditions as Example 1 but controlling the dough preparation time after spreading the chemical leavening agents to 10 minutes.

The density and the remaining gas yield of the frozen pie dough thus obtained were measured as in Example 1. As, a result, the pie dough density was 1.072 g/cm$^3$ and the remaining gas yield was 0.56 ml/g. When the vertical and horizontal sections to the void layers were observed, several void layers were observed along the fat layers.

The frozen apple pie dough thus obtained was stored in a frozen state in a freezer at −18° C. for 10 days. Then it was taken out from the freezer and baked without thawing in a jet oven at 270° C. for 6 minutes and 30 seconds to give an apple pie. As Table 3 shows, the apple pie thus obtained showed uniform rising as a whole with a layered texture, a favorable color and a crispy texture and could be easily baked. Also, the pie dough in the part of the apple filling could be easily baked and showed a favorable crispy texture.

EXAMPLE 3

Frozen Apple Pie Dough (3)

In preparing a frozen apple pie dough using the composition of Example 1, the mixing, folding, shaping and freezing were carried out under the same conditions as Example 1 but controlling the amount of the chemical leavening agents to be spread to 1.0%. The dough temperature in the step of shaping was 22° C. and it took 30 minutes for preparing the shaped dough (i.e., from the spreading of the chemical leavening agents to the introduction into the freezer).

The density and the remaining-gas yield of the frozen pie dough thus obtained were measured as in Example 1. As a result, the pie dough density was 1.081 g/cm$^3$ and the remaining gas yield was 0.21 ml/g. When the vertical and horizontal sections to the void layers were observed, several void layers were observed along the fat layers.

The frozen apple pie dough thus obtained was stored in a frozen state in a freezer at −18° C. for 10 days. Then it was taken out from the freezer and baked without thawing in a jet oven at 270° C. for 6 minutes and 30 seconds to give an apple pie. As Table 3 shows, the apple pie thus obtained showed uniform rising as a whole with a layered texture, a favorable color and a crispy texture and could be easily baked. Also, the pie dough in the part of the apple filling could be easily baked and showed a favorable crispy texture.

EXAMPLE 4

Frozen Apple Pie Dough (4)

In preparing a frozen apple pie dough using the composition of Example 1, the mixing, folding, shaping and freezing were carried: out under the same conditions as Example 1 but controlling the amount of the chemical leavening agents to be spread to 5.0%. The dough temperature in the step of shaping was 22° C. and it took 30 minutes for preparing the shaped dough (i.e., from the spreading of the chemical leavening agents to the introduction into the freezer).

The density and the remaining gas yield of the frozen pie dough thus obtained were measured as in Example 1. As a result, the pie dough density was 1.012 g/cm$^3$ and the remaining gas yield was 0.94 ml/g. When the vertical and horizontal sections to the void layers were observed, several void layers were observed along the fat layers.

The frozen apple pie dough thus obtained was stored in a frozen state in a freezer at −18° C. for 10 days. Then it was taken out from the freezer and baked without thawing in a jet oven at 270° C. for 6 minutes and 30 seconds to give an apple pie. As Table 3 shows, the apple pie thus obtained showed uniform rising as a whole with a layered texture, a favorable color and a crispy texture and could be easily baked. Also, the pie dough in the part of the apple filling could be easily baked and showed a favorable crispy texture. Although the piecrust showed some bitterness due to the chemical leavening agents, it was not so offensive.

EXAMPLE 5

Frozen Apple Pie Dough (5)

In preparing a frozen apple pie dough using the composition of Example 1, the mixing, folding, shaping and freezing were carried out under the same conditions as Example 1 but using 500 g of a roll-in fat of about 100 mm in length×about 100 mm×about 5.5 mm in thickness. The dough temperature in the step of shaping was 22° C. and it took 30 minutes for preparing the shaped dough (i.e., from the spreading of the chemical leavening agents to the introduction into the freezer).

The density and the remaining gas yield of the frozen pie dough thus obtained were measured as in Example 1. As a result, the pie dough density was 1.066 g/cm$^3$ and the remaining gas yield was 0.43 ml/g. When the vertical and horizontal sections to the void layers were observed, several void layers were observed along the fat layers.

The frozen apple pie dough thus obtained was stored in a frozen state in a freezer at −18° C. for 10 days. Then it was taken out from the freezer and baked without thawing in a jet oven at 270° C. for 6 minutes and 30 seconds to give an apple pie. As Table 3 shows, the apple pie thus obtained showed uniform rising as a whole with a layered texture, a favorable color and a crispy texture and could be easily baked. Also, the pie dough in the part of the apple filling could be easily baked and showed a somewhat favorable crispy texture.

EXAMPLE 6

Frozen Apple Pie Dough (6)

In preparing a frozen apple pie dough using the composition of Example 1, the mixing, folding, shaping and freezing were carried out under the same conditions as Example 1 but using 750 g of a roll-in fat of about 100 mm in length×about 100 mm×about 8.3 mm in thickness and thrice-folding the dough in four thereby forming 64 fat layers. The dough temperature in the step of shaping was 22° C. and it took 30 minutes for preparing the shaped dough (i.e., from the spreading of the chemical leavening agents to the introduction into the freezer).

The density and the remaining gas yield of the frozen pie dough thus obtained were measured as in Example 1. As a result, the pie dough density was 1.041 g/cm³ and the remaining gas yield was 0.35 ml/g. When the vertical and horizontal sections to the void layers were observed, several void layers were observed along the fat layers.

The frozen apple pie dough thus obtained was stored in a frozen state in a freezer at −18° C. for 10 days. Then it was taken out from the freezer and baked without thawing in a jet oven at 270° C. for 6 minutes and 30 seconds to give an apple pie. As Table 3 shows, the apple pie thus obtained showed uniform rising as a whole with a layered texture, a favorable color and a crispy texture and could be easily baked. Also, the pie dough in the part of the apple filling could be relatively easily baked and showed a favorable crispy texture.

EXAMPLE 7

Frozen Apple Pie Dough (7)

In preparing a frozen apple pie dough using the composition of Example 1, the mixing, folding, shaping and freezing were carried out under the same conditions as Example 1 but using 1000 g of a roll-in fat of about 100 mm in length×about 100 mm×about 11 mm in thickness. The dough temperature in the step of shaping was 22° C. and it took 30 minutes for preparing the shaped dough (i.e., from the spreading of the chemical leavening agents to the introduction into the freezer).

The density and the remaining gas yield of the frozen pie dough thus obtained were measured as in Example 1. As a result, the pie dough density was 1.032 g/cm³ and the remaining gas yield was 0.48 ml/g. When the vertical and horizontal sections to the void layers were observed, several void layers were observed along the fat layers.

The frozen apple pie dough thus obtained was stored in a frozen state in a freezer at −18° C. for 10 days. Then it was taken out from the freezer and baked without thawing in a jet oven at 270° C. for 6 minutes and 30 seconds to give an apple pie. As Table 3 shows, the apple pie thus obtained was comparable in the crispiness and half-baked feel to the conventional pies but showed uniform rising as a whole, thereby achieving a highly favorable layered appearance.

TABLE 3

Pie dough conditions and evaluation of baked products of Examples (after baking in jet oven at 270° C. for 6 minutes and 30 seconds)

| | | | Example 1 | Example 2 | Example 3 | Example 4 | Example 5 | Example 6 | Example 7 |
|---|---|---|---|---|---|---|---|---|---|
| Observation of pie dough | Pie dough density (g/cm³) | | 1.052 | 1.072 | 1.081 | 1.012 | 1.066 | 1.041 | 1.032 |
| | Void layer | | many | yes | yes | many | many | yes | yes |
| | Remaining gas yield (ml/g) | | 0.48 | 0.56 | 0.21 | 0.94 | 0.43 | 0.35 | 0.48 |
| Baked form | Rise | Maximum | 34 mm | 31 mm | 30 mm | 33 mm | 29 mm | 43 mm | 20 mm |
| | | Minimum | 28 mm | 28 mm | 20 mm | 28 mm | 22 mm | 35 mm | 18 mm |
| | | Difference | 6 mm | 3 mm | 10 mm | 5 mm | 7 mm | 8 mm | 2 mm |
| | Stability | | uniform and stable | uniform and stable | stable | uniform and stable | uniform and stable | stable | stable |
| Sensory evaluation | Appearance | Rising | 7 | 8 | 6 | 8 | 7 | 7 | 6 |
| | | Layered structure | 8 | 8 | 6 | 9 | 6 | 5 | 9 |
| | Baking performance/ Crispiness | Whole | 8 | 9 | 5 | 7 | 5 | 6 | 3 |
| | | Filling | 8 | 8 | 5 | 7 | 8 | 6 | 2 |
| | Evaluation of piecrust | | good | good | good | somewhat bitter | good | good | good |

Note:
Sensory evaluation data are each expressed in the average of scores (10 grades) given by 10 skilled panelists.

COMPARATIVE EXAMPLE 1

Frozen Apple Pie Dough (8)

A frozen apple pie dough was prepared as in Example 1 but spreading no chemical leavening agent. After mixing the dough, no chemical leavening agent was spread on the step of wrapping the roll-in margarine. Subsequently, the dough was folded in four, three and four as in Example 1 to give a pie dough of 3.0 mm in thickness. This pie dough was cut into rectangular pieces (150 mm in length×60 mm in width, 150 mm in length x 65 mm in width) and 35 g of an apple filling (moisture content: 63%) was wrapped in these two pie dough pieces (total weight: 60 g) to give an apple pie of 60 mm in width and 150 mm in length. After freezing in the freezer at −30° C. for 40 minutes, a frozen apple pie dough of a center temperature of −18° C. was obtained.

The density and the remaining gas yield of the frozen pie dough thus obtained were measured as in Example 1. As a result, the pie dough density was 1.113 g/cm³ and the remaining gas yield was 0.00 ml/g. When the vertical and horizontal sections to the void layers were observed, no void layer could be observed.

The frozen apple pie dough thus obtained was stored in a frozen state in a freezer at −18° C. for 10 days. Then it was taken out from the freezer and baked without thawing in a jet oven at 270° C. for 6 minutes and 30 seconds to give an apple pie. As Table 4 shows, the apple pie thus obtained was unstable in shape with no layered texture, showed no crispiness, could be hardly baked and had a heavy texture. In particular, the piecrust at the apple filling showed a moist and half-baked feel.

EXAMPLE 8

Frozen Apple Pie Dough (9)

In preparing a frozen apple pie dough using the composition of Example 1, the mixing, folding, shaping and freezing were carried out under the same conditions as Example 1 but folding the dough in three thrice thereby forming 27 fat layers. The dough temperature in the step of shaping was 22° C. and it took 30 minutes for preparing the shaped dough (i.e., from the spreading of the chemical leavening agents to the introduction into the freezer).

The density and the remaining gas yield of the frozen pie dough thus obtained were measured as in Example 1. As a result, the pie dough density was 1.065 g/cm³ and the remaining gas yield was 0.54 ml/g. When the vertical and horizontal sections to the void layers were observed, several large void layers were definitely observed along the fat layers.

The frozen apple pie dough thus obtained was stored in a frozen state in a freezer at −18° C. for 10 days. Then it was taken out from the freezer and baked without thawing in a jet oven at 270° C. for 6 minutes and 30 seconds to give an apple pie. As Table 4 shows, the apple pie thus obtained was comparable in the crispiness and half-baked feel to the conventional pies but showed uniform rising as a whole, thereby achieving a highly favorable layered appearance.

TABLE 4

Pie dough conditions and evaluation of baked products of Examples (after baking in jet oven at 270° C. for 6 minutes and 30 seconds)

| | | Comparative Example 1 | Example 8 |
|---|---|---|---|
| Observation of pie dough | Pie dough density (g/cm³) | 1.113 | 1.065 |
| | Void layer | many | yes |
| | Remaining gas yield (ml/g) | 0.00 | 0.54 |
| Baked form | Rise | | |
| | Maximum | 33 mm | 33 mm |
| | Minimum | 18 mm | 25 mm |
| | Difference | 15 mm | 8 mm |
| | Stability | unstable | somwhat stable |
| Sensory evaluation | Appearance | | |
| | Rising | 4 | 7 |
| | Layered structure | 2 | 7 |
| | Baking performance/ Crispiness | | |
| | Whole | 3 | 4 |
| | Filling | 2 | 3 |
| | Taste of piecrust | half-baked feel | half-baked feel |

Note) Sensory evaluation data are each expressed in the average of scores (10 grades) given by 10 skilled panelists.

EXAMPLE 9

The frozen apple pie dough (1) of Example 1 was baked in a convection oven at 200° C. for 15 minutes. Table 5 shows the evaluation data of the baked product.

EXAMPLE 10

The frozen apple pie dough (2) of Example 2 was baked in a convection oven at 200° C. for 15 minutes. Table 5 shows the evaluation data of the baked product.

EXAMPLE 11

The frozen apple pie dough (3) of Example 3 was baked in a convection oven at 200° C. for 15 minutes. Table 5 shows the evaluation data of the baked product.

COMPARATIVE EXAMPLE 2.

The frozen apple pie dough (8) of Comparative Example 1 was baked in a convection oven at 200° C. for 15 minutes. Table 5 shows the evaluation data of the baked product.

TABLE 5

Evaluation of baked products (after baking in convection oven at 200° C. for 15 minutes)

| | | Example 9 | Example 10 | Example 11 | Comparative Example 2 |
|---|---|---|---|---|---|
| Dough employed | | pie dough (1) | pie dough (2) | pie dough (3) | pie dough (8) |
| Baked form | Rise | | | | |
| | Maximum | 35 mm | 33 mm | 34 mm | 40 mm |
| | Minimum | 25 mm | 28 mm | 22 mm | 18 mm |
| | Difference | 10 mm | 5 mm | 12 mm | 22 mm |
| | Stability | stable | uniform and stable | stable | rough and unstable |
| Sensory evaluation | Appearance | | | | |
| | Rising | 9 | 8 | 6 | 5 |
| | Layered | 10 | 10 | 7 | 6 |

TABLE 5-continued

Evaluation of baked products (after baking in convection oven at 200° C. for 15 minutes)

| | Example 9 | Example 10 | Example 11 | Comparative Example 2 |
|---|---|---|---|---|
| structure | | | | |
| Baking performance/ Crispiness | | | | |
| Whole | 10 | 10 | 8 | 7 |
| Filling | 9 | 9 | 6 | 4 |

Note) Sensory evaluation data are each expressed in the average of scores (10 grades) given by 10 skilled panelists.

INDUSTRIAL APPLICABILITY

Even in case of baking in a high-power oven directly from a frozen state, the frozen pie dough or the frozen pie dough product according to the invention makes it possible to provide a pie which has a stable shape, can be easily baked, has a layered structure, is well risen and shows a favorable and highly crispy texture.

What is claimed is:

1. A frozen pie dough to be stored in a frozen state which comprises a pie dough having dough layers containing a cereal flour, water and a fat as the main components and fat layers laminated with said dough layers alternatively, wherein voids and a chemical leavening agent are present between the dough layers and the fat layers of said pie dough, and said chemical leavening agent is a delayed action type chemical leavening agent and is uniformly dispersed between the dough layers and the fat layers.

2. The frozen pie dough as claimed in claim 1, wherein said pie dough has a pie dough density of 1.01 g/cm³ or more and less than 1.085 g/cm³.

3. The frozen pie dough as claimed in claim 1 wherein the gas yield per gram of the pie dough while baking said pie dough is from 0.1 ml/g to 1.2 ml/g.

4. A process for producing a frozen pie dough comprising preparing a dough containing a cereal flour, water and a fat as the main components, spreading a chemical leavening agent on the surface of said dough and then providing a roll-in fat thereon or providing a roll-in fat on the surface of said dough and then spreading a chemical leavening agent thereon, and piling up said dough to give layers.

5. A frozen pie dough product wherein a filling is wrapped in the pie dough as claimed in any of claims 1 to 3.

6. The frozen pie dough of claim 1 wherein the gas yield per gram of the pie dough while baking said pie dough is from 0.2 ml/g to 1.0 ml/g.

7. The frozen pie dough of claim 1, wherein said pie dough has a pie dough density between 1.01 g/cm³ and 1.075 g/cm³.

8. The process of claim 4, wherein said chemical leavening agent comprises a combination of a quick action type chemical leavening agent and a delayed action type chemical leavening agent.

9. The process of claim 8, wherein the ratio of said quick action type chemical leavening agent and said delayed action type chemical leavening agent ranges from 10:90 to 50:50.

10. A process for producing a pie, which comprises baking a pie comprising a pie dough, where said pie dough is in a frozen state, directly at a high temperature and in a short period of time, wherein said pie dough has dough layers containing a cereal flour, water and a fat as the main components, and fat layers laminated with said dough layers alternatively, wherein voids and a chemical leavening agent are present between the dough layers and the fat layers of said pie dough.

11. The process according to claim 10, wherein said chemical leavening agent forms voids between said layers.

12. A process for producing a pie, which comprises:
preparing a dough containing a cereal flour, water and a fat as the main components, spreading a chemical leavening agent on the surface of said dough and then providing a roll-in fat thereon or providing a roll-in fat on the surface of said dough and then spreading a chemical leavening agent thereon, and piling up said dough to give layers;
freezing the resulting dough to give a frozen pie dough; and
baking a pie comprising said frozen pie dough at a high temperature and in a short period of time.

13. The process according to claim 12, wherein some of said chemical leaving agent remains unreacted prior to said backing.

14. The frozen pie dough of claim 1, wherein said chemical leavening agent comprises sodium hydrogencarbonate.

15. A frozen pie dough to be stored in a frozen state which comprises a pie dough having dough layers containing a cereal flour, water and a fat as the main components and fat layers laminated with said dough layers alternatively;
wherein voids and a chemical leavening agent are present between the dough layers and the fat layers of said pie dough; and
said chemical leavening agent is substantially uniformly dispersed between said dough layers and fat layers.

16. The frozen pie dough of claim 1, wherein said voids form a layer of voids, wherein said void layer is present between one of said dough layers and one of said fat layers.

17. The frozen pie dough of claim 16, wherein the number of said void layers is from 16 to 128.

18. The frozen pie dough of claim 17, wherein said number of void layers is from 24 to 72.

19. The frozen pie dough of claim 1, wherein the number of fat layers is from 32 to 64.

20. A frozen pie dough comprising:
dough layers containing a cereal flour, water and a fat as the main components; and
fat layers laminated with said dough layers alternatively;
wherein voids and ac chemical leavening agents are present between the dough layers and the fat layers of said pie dough, and said chemical leavening agents is a delayed action type chemical leavening agent;
wherein each of said chemical leavening agents comprise a gas generating agent and a leavening acid;
wherein said chemical leavening agent are uniformly dispersed between dough layers and fat layers;
wherein said voids form continuous layers of voids, wherein said void layers are present between said dough layers and said fat layers; and
wherein when said pie dough is frozen, some of the gas-generating agent and leavening acid remain unreacted.

* * * * *